United States Patent
Zhao et al.

(10) Patent No.: US 10,488,695 B2
(45) Date of Patent: Nov. 26, 2019

(54) TEMPERATURE-CONTROLLED ALIGNMENT DEVICE BASED ON MULTI-MODEL GLASS TECHNOLOGY

(71) Applicant: Shenzhen China Star Optoelectronics Technology Co., Ltd., Shenzhen, Guangdong (CN)

(72) Inventors: Rentang Zhao, Guangdong (CN); Chung Ching Hsieh, Guangdong (CN); Yongchao Zhao, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 47 days.

(21) Appl. No.: 15/500,175

(22) PCT Filed: Jan. 19, 2017

(86) PCT No.: PCT/CN2017/071739
§ 371 (c)(1),
(2) Date: Dec. 15, 2017

(87) PCT Pub. No.: WO2018/076557
PCT Pub. Date: May 3, 2018

(65) Prior Publication Data
US 2018/0217436 A1    Aug. 2, 2018

(30) Foreign Application Priority Data

Oct. 28, 2016 (CN) .......................... 2016 1 0956615

(51) Int. Cl.
*G02F 1/1333* (2006.01)
*G02F 1/1337* (2006.01)

(52) U.S. Cl.
CPC ...... *G02F 1/133382* (2013.01); *G02F 1/1337* (2013.01)

(58) Field of Classification Search
CPC ......................... G02F 1/133382; G02F 1/1337
USPC ........................................................ 349/123
See application file for complete search history.

(56) References Cited

U.S. PATENT DOCUMENTS

| | | | | |
|---|---|---|---|---|
| 5,980,991 A | * | 11/1999 | Sakamoto | ............ C03C 17/002 427/374.1 |
| 8,432,526 B2 | | 4/2013 | Tanaka | |
| 2004/0131861 A1 | * | 7/2004 | Chae | ................ G02F 1/133723 428/411.1 |
| 2012/0212467 A1 | * | 8/2012 | Kohtoku | ............... G02F 1/1354 345/207 |

(Continued)

FOREIGN PATENT DOCUMENTS

CN    203363865 U    12/2013
WO    2016127647 A1    8/2016

*Primary Examiner* — Charles S Chang

(57) ABSTRACT

Disclosed is a temperature-controlled alignment device based on multi-model glass technology. The device includes a stage divided into at least two areas and heating modules corresponding to respective areas. Each of the heating modules includes a heat conductive sheet, a liquid pipe, and an electric heater. Different areas are heated by arranging a heating module for each of the areas, so that reaction rates of reactive monomers in panels of different areas have a same reaction rate so as to form a same pretilt angle.

10 Claims, 3 Drawing Sheets

(56) References Cited

U.S. PATENT DOCUMENTS

2013/0267143 A1* 10/2013 Kim .................. G02F 1/1341
　　　　　　　　　　　　　　　　　　　　445/25
2017/0227821 A1　　8/2017 Song et al.

* cited by examiner

TEMPERATURE-CONTROLLED ALIGNMENT DEVICE BASED ON MULTI-MODEL GLASS TECHNOLOGY

CROSS-REFERENCE TO RELATED APPLICATIONS

This application claims the priority of Chinese patent application CN 201610956615.0, entitled "Temperature-controlled alignment device based on multi-model glass technology" and filed on Oct. 28, 2016, the entirety of which is incorporated herein by reference.

FIELD OF THE INVENTION

The present disclosure relates to the technical field of liquid crystal display panel, and in particular, to a temperature-controlled alignment device based on multi-model glass technology.

BACKGROUND OF THE INVENTION

Polymer stabilized vertical alignment (PS-VA) is a technology of thin film field-effect transistor of liquid crystal display (LCD) device. In a cell manufacturing process of PS-VA, reactive monomers are included among liquid crystals, and therefore there is a procedure of liquid crystal curing. As shown in FIG. 1, reactive monomers included among liquid crystals react by irradiating a substrate with ultraviolet light, so that the liquid crystals can have a pretilt angle. Such a procedure is called ultraviolet light alignment.

During a course of ultraviolet light alignment, a size of the pretilt angle formed by liquid crystals would directly affect subsequent optical characteristics of a panel. When the pretilt angle is too small, the panel would have a very long response time. When the pretilt angle is too large, the panel would have very low contrast. Therefore, a proper pretilt angle needs to be formed for the panel in production.

In actual production, large substrate production is generally adopted, i.e., a plurality of panels can be distributed on one large substrate. As shown in FIG. 2, in order to facilitate design and manufacture, a plurality of panels arranged on a large substrate generally have a same size. Since a large substrate has a fixed size, in production, when products with a certain size are arranged on the substrate, a large empty space would be left on the substrate, which results in a low utilization rate of the substrate. Therefore, at present, products based on multi-model glass technology (NMG) are developed in the industry. As shown in FIG. 3, in such a manufacturing manner, products with different sizes are arranged on a large substrate at the same time, so that there can be a minimum empty space on the substrate at the same time, thereby realizing a maximum utilization rate of the substrate.

In actual production, an ultraviolet light intensity and a stage temperature within a stage are uniform. With respect to a traditional production manner, panels on a substrate all have a same size, and therefore the panels are designed in a same way and have a same aperture rate. Therefore, ultraviolet light intensities received by reactive monomers in respective panels on the substrate are same, and a same pretilt angle can be formed in the panels.

With respect to MMG products, since panels on a substrate have different sizes, the panels of different sizes are designed in different ways and have different aperture rates. Therefore, when ultraviolet light alignment is performed in a stage, ultraviolet light intensities received by reactive monomers in the panels of different sizes are different. Therefore, products of different sizes have different pretilt angles at last, which leads to a result that properties of the products of different sizes cannot reach standards thereof at the same time.

SUMMARY OF THE INVENTION

The present disclosure provides a temperature-controlled alignment device based on multi-model glass technology, so as to solve the technical problem that, when ultraviolet light alignment is performed for panels of different sizes on a substrate, properties of products cannot reach standards thereof at the same time due to different pretilt angles.

The present disclosure provides a temperature-controlled alignment device based on multi-model glass technology. The device comprises a stage which is divided into at least two areas and heating modules corresponding to respective areas. Each of the heating modules comprises a heat conductive sheet, a liquid pipe, and an electric heater. The heat conductive sheet is arranged at a bottom of the stage, and matches a corresponding area in size and shape. The liquid pipe is in contact with the heat conductive sheet. The electric heater is in contact with liquid in the liquid pipe, and is configured to heat liquid. Gaps are arranged between heat conductive sheets.

Preferably, a controller which is connected to the electric heater in each of the heating modules is further included, and the controller is configured to control a temperature of the electric heater.

Preferably, a heating module further comprises a first temperature sensor, which is arranged in the liquid pipe and connected to the controller.

Preferably, the heating module further comprises a pump in communication with an inlet of the liquid pipe and a liquid storage tank in communication with an outlet of the liquid pipe.

Preferably, the heating module further comprises a first electromagnetic valve, which is arranged at the inlet of the liquid pipe and connected to the controller.

Preferably, the heating module further comprises a second electromagnetic valve, which is arranged at the outlet of the liquid pipe and connected to the controller.

Preferably, gaps between heat conductive sheets are filled with a heat insulation material.

Preferably, the liquid pipe is arranged in a ring shape and uniformly arranged on the heat conductive sheet.

Preferably, the heating module further comprises a second temperature sensor, which is arranged at the bottom of the stage and connected to the controller.

Preferably, the heat conductive sheet is a copper sheet or an aluminum sheet.

According to the present disclosure, in the temperature-controlled alignment device based on multi-model glass technology, a stage is divided into at least two areas, and each of the areas is provided with one heating module. Different areas are heated by heating modules, so that reaction rates of reactive monomers in panels of different areas have a same reaction rate, thereby forming a same pretilt angle. Thus, when products of different sizes are manufactured on a same substrate, properties of products can reach standards thereof at the same time.

Other advantages, objectives, and features of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings are provided for further understandings of the present disclosure or the prior art, and constitute one part of the description. The drawings are used for interpreting the present disclosure together with the embodiments, not for limiting the present disclosure. In the drawings.

DETAILED DESCRIPTION OF THE EMBODIMENTS

As long as there is no structural conflict, all the technical features mentioned in all the embodiments can be combined together in any manner, and the technical solutions obtained in this manner all fall within the scope of the present disclosure. The embodiments of the present disclosure will be explained in detail hereinafter with reference to the accompanying drawings.

Embodiment 1

Figure 1:
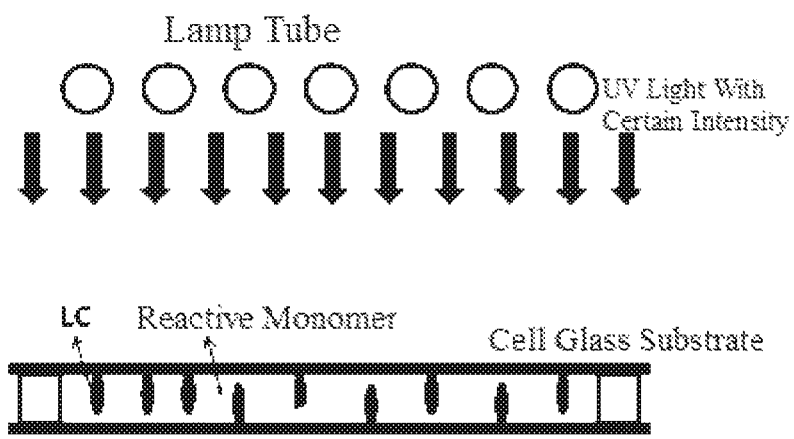
FIG. 1 schematically shows ultraviolet light alignment in the prior art.
Figure 2:
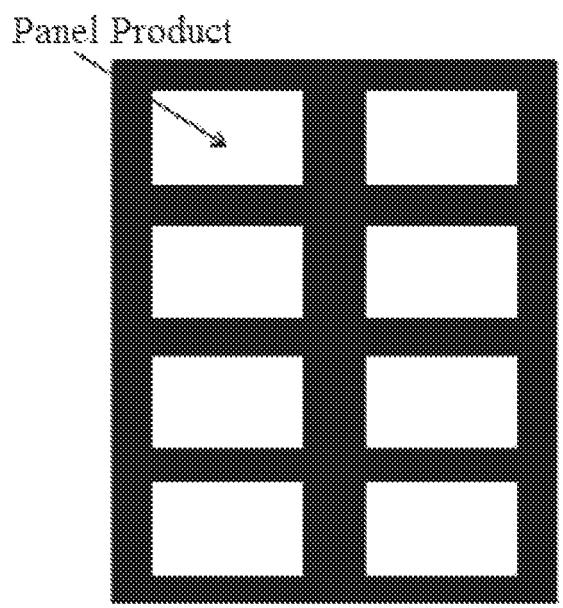
FIG. 2 schematically shows an arrangement of a traditional glass substrate.
Figure 3:
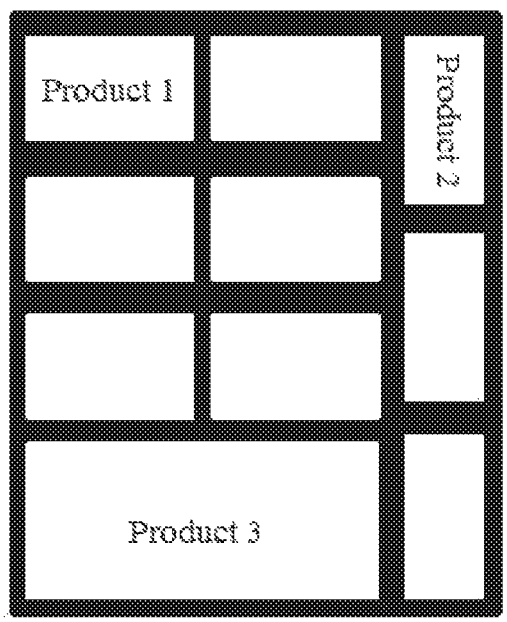
FIG. 3 schematically shows an arrangement of an MMG glass substrate.
Figure 4:
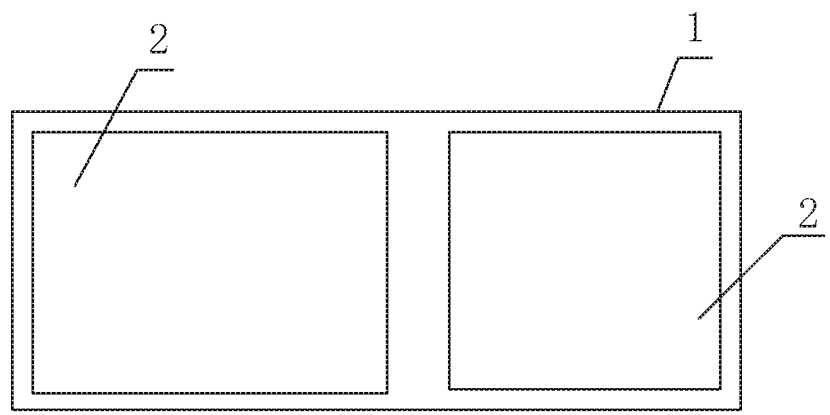
FIG. 4 shows a top view of a stage of a temperature-controlled alignment device based on multi-model glass technology according to Embodiment 1 of the present disclosure.
Figure 5:
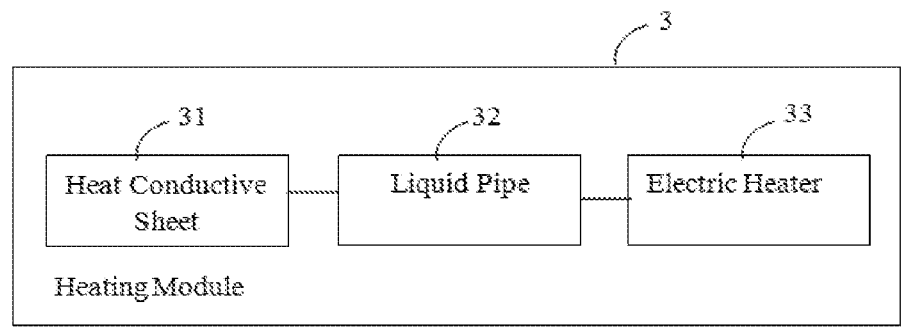
FIG. 5 schematically shows a structure of a heating module of the temperature-controlled alignment device based on multi-model glass technology according to Embodiment 1 of the present disclosure.

FIG. 4 shows a top view of a stage of a temperature-controlled alignment device based on multi-model glass technology according to Embodiment 1 of the present disclosure. As shown in FIG. 5, the present embodiment provides a temperature-controlled alignment device based on multi-model glass technology. The device comprises a stage 1 divided into at least two areas 2, and further comprises heating modules 3 corresponding to respective areas 2. Each of the heating modules 3 comprises a heat conductive sheet 31, which is arranged at a bottom of the stage 1 and matches a corresponding area 2 in size and shape, a liquid pipe 32, which is in contact with the heat conductive sheet 31, and an electric heater 33, which is in contact with liquid in the liquid pipe 32. The electric heater 33 is configured to heat the liquid, and gaps are arranged between heat conductive sheets 31.

An existing stage 1 is single-temperature controlled, i.e., one stage 1 has only one temperature, and a reaction rate of reactive monomers is strongly correlated to the temperature of the stage 1. The stage 1 can be arranged as multi-point temperature controlled so as to compensate the reaction rate of the reactive monomers with temperature (the higher the temperature is, the greater the reaction rate is). That is, one stage 1 can have different temperature areas 2, and respective temperature areas 2 correspond to different products. In this way, by means of the temperature, reactive monomers in panels of different sizes have a same reaction rate, thereby forming a same pretilt angle. Therefore, in the present embodiment, the stage 1 is divided into at least two areas 2, and each of the areas 2 corresponds to one heating module 3, which is configured to heat a corresponding area 2. Different products are placed on different areas 2, and the stage 1 is irradiated with ultraviolet lights having a same intensity. At the same time, different areas 2 are heated by heating modules 3 using different temperatures, so that reactive monomers in different areas 2 have a same reaction rate, thereby forming a same pretilt angle.

The stage 1 is divided into a plurality of areas 2 for producing panels of different sizes. Each of the areas 2 is provided with one heating module 3. A heating module 3 comprises a heat conductive sheet 31, a liquid pipe 32, and an electric heater 33. The heat conductive sheet 31 is arranged at a bottom of the stage 1 and matches a heated area 2 in size and shape. The heat conductive sheet 31 is a copper sheet or an aluminum sheet. The heat conductive sheet 31 is in contact with the bottom of the stage 1. The liquid pipe 32 is in contact with the heat conductive sheet 31, and is configured to transfer heat to the heat conductive sheet 31, which further transfers the heat to a corresponding area 2. The electric heater 33 is arranged in the liquid pipe 32, and is configured to heat liquid in the liquid pipe 32. The liquid in the liquid pipe 32 can be water. Gaps are arranged between respective heat conductive sheets 31 to avoid an effect on temperatures of respective areas 2 due to heat transmission therebetween. Further, the gaps between the heat conductive sheets 31 are filled with heat insulation materials in order to further cut off heat transmission therebetween, so that an effect on temperatures of adjacent areas 2 can be avoid.

According to the present embodiment, in the temperature-controlled alignment device based on multi-model glass technology, the stage 1 is divided into at least two areas 2, and each of the areas 2 is provided with one heating module 3. Different areas 2 are heated by means of heating modules 3, so that reactive monomers in panels of different areas 2 have a same reaction rate, thereby forming a same pretilt angle. Thus, when products of different sizes are manufactured on a same substrate, properties of the products can reach standards thereof at the same time.

Embodiment 2

The present embodiment provides supplementary explanation to the above embodiment.

Figure 6:
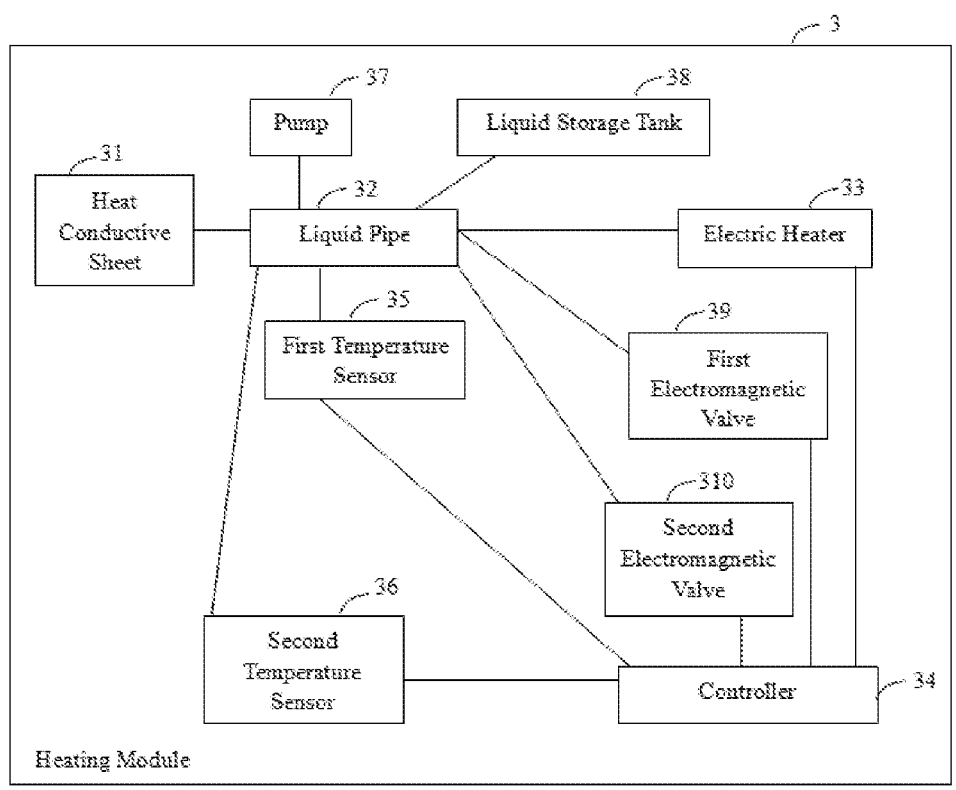
FIG. 6 schematically shows a structure of a heating module of a temperature-controlled alignment device based on multi-model glass technology according to Embodiment 2 of the present disclosure.

FIG. 6 schematically shows a structure of a heating module of a temperature-controlled alignment device based on multi-model glass technology according to the present embodiment. As shown in FIG. 6, the present embodiment provides the temperature-controlled alignment device based on multi-model glass technology. A controller 34 connected to an electric heater 33 in each heating module 3 is further included. The controller 34 is configured to control a temperature of each electric heater 33, so that heating modules 3 reach different temperatures.

Further, as shown in FIG. 6, the heating module 3 further comprises a first temperature sensor 35, which is arranged in a liquid pipe 32 and connected to the controller 34. The first temperature sensor 35 is configured to measure a liquid temperature in the liquid pipe 32 and feed back the liquid temperature to the controller 34. The controller 34 is configured to adjust a heating temperature of a corresponding electric heater 33 according to the liquid temperature fed back, thereby controlling the liquid temperature in the liquid pipe 32.

Further, the heating module 3 further comprises a pump 37 in communication with an inlet of the liquid pipe 32 and a liquid storage tank 38 in communication with an outlet of the liquid pipe 32. The pump 37 is configured to deliver liquid into the liquid pipe 32 and further deliver the liquid from the liquid pipe 32 into the liquid storage tank 38. The liquid storage tank 38 can further be configured to be connected to the inlet of the liquid pipe 32. When the heating module 3 is used, liquid is delivered from the liquid storage tank 38 into the liquid pipe 32 by using the pump 37. After use of the heating module 3, the liquid is delivered from the liquid pipe 32 into the liquid storage tank 38 by using the pump 37, so as to realize recycle of the liquid. Of course, the liquid pipe 32 may further be in communication with a special liquid supply tank.

Further, the heating module 3 further comprises a first electromagnetic valve 39, which is arranged at the inlet of the liquid pipe 32 and connected to the controller 34. When it is necessary to deliver the liquid from a liquid supply tank into the liquid pipe 32 by using the pump 37, the first electromagnetic valve 39 is opened by the controller 34. After the liquid is delivered, the first electromagnetic valve 39 is closed by the controller 34 for blocking a channel between the liquid pipe 32 and the liquid supply tank.

Further, the heating module 3 further comprises a second electromagnetic valve 310, which is arranged at the outlet of the liquid pipe 32 and connected to the controller 34. When it is necessary to deliver the liquid from the liquid pipe 32 into the liquid storage tank 38 by using the pump 37, the second electromagnetic valve 310 is opened by the controller 34. After the liquid is delivered, the second electromagnetic valve 310 is closed by the controller 34 for blocking a channel between the liquid pipe 32 and the liquid storage tank 38.

Further, the liquid pipe 32 is arranged in a ring shape and uniformly arranged on a heat conductive sheet 31. The liquid pipe 32 is uniformly arranged in a ring shape on the heat conductive sheet 31, so as to transfer heat to the heat conductive sheet 31 uniformly.

Further, the heating module 3 further comprises a second temperature sensor 36, which is arranged at a bottom of a stage 1 and connected to the controller 34. The second temperature sensor 36 is configured to measure a temperature of the stage 1 and feed back the temperature of the stage 1 to the controller 34. The controller 34 is configured to adjust a heating temperature of a corresponding electric heater 33 according to the temperature of the stage 1 fed back, thereby controlling the liquid temperature in the liquid pipe 32 and achieving a purpose of controlling the temperature of the stage 1.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

What is claimed is:

1. A temperature-controlled alignment device based on multi-model glass technology, wherein the device comprises a stage which is divided into different sized areas, and configured for placement of panels on the stage corresponding to the different sized areas, and heating modules corresponding to respective areas, wherein the heating modules are arranged on a bottom of the stage, wherein each of the heating modules comprises:
    a heat conductive sheet, which is arranged at the bottom of the stage and matches a corresponding area of the stage in size and shape;
    a liquid pipe in contact with the heat conductive sheet; and
    an electric heater in contact with liquid in the liquid pipe, wherein the electric heater is configured to heat liquid, and gaps are arranged between heat conductive sheets;
    wherein the heat conductive sheet transfers heat to the corresponding area of the stage, such that the different sized areas have different temperatures and panels placed on the stage in a corresponding area tilt a same pretilt angle.

2. The temperature-controlled alignment device based on multi-model glass technology according to claim 1, wherein a controller which is connected to the electric heater in each of the heating modules is further included, and the controller is configured to control a temperature of the electric heater.

3. The temperature-controlled alignment device based on multi-model glass technology according to claim 2, wherein a heating module further comprises a first temperature sensor, which is arranged in the liquid pipe and connected to the controller.

4. The temperature-controlled alignment device based on multi-model glass technology according to claim 2, wherein the heating module further comprises a first electromagnetic valve, which is arranged at the inlet of the liquid pipe and connected to the controller.

5. The temperature-controlled alignment device based on multi-model glass technology according to claim 2, wherein the heating module further comprises a second electromagnetic valve, which is arranged at the outlet of the liquid pipe and connected to the controller.

6. The temperature-controlled alignment device based on multi-model glass technology according to claim 2, wherein the heating module further comprises a second temperature sensor, which is arranged at the bottom of the stage and connected to the controller.

7. The temperature-controlled alignment device based on multi-model glass technology according to claim 2, wherein the heat conductive sheet is a copper sheet or an aluminum sheet.

8. The temperature-controlled alignment device based on multi-model glass technology according to claim 1, wherein the heating module further comprises a pump in communication with an inlet of the liquid pipe and a liquid storage tank in communication with an outlet of the liquid pipe.

9. The temperature-controlled alignment device based on multi-model glass technology according to claim 1, wherein gaps between heat conductive sheets are filled with a heat insulation material.

10. The temperature-controlled alignment device based on multi-model glass technology according to claim 1, wherein the liquid pipe is arranged in a ring shape and uniformly arranged on the heat conductive sheet.

* * * * *